March 24, 1959 J. VUILLEMIN 2,878,786
MULTIPLE VALVE APPARATUS FOR DISTRIBUTING FLUID
TO A PLURALITY OF FLUID OPERATED DEVICES
Filed April 26, 1954 4 Sheets-Sheet 1
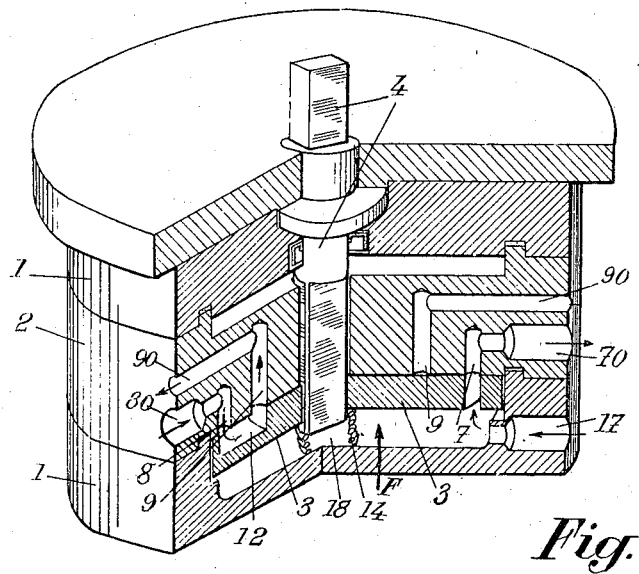
Fig. 1
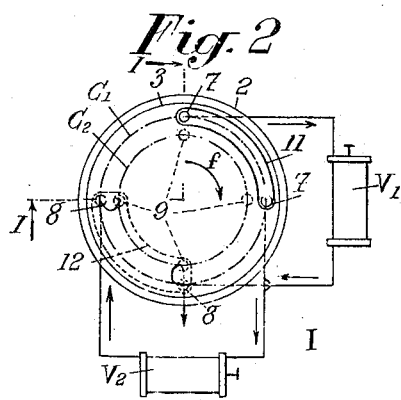
Fig. 2
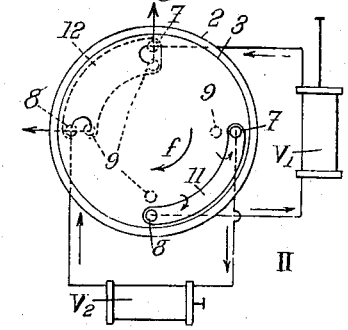
Fig. 3
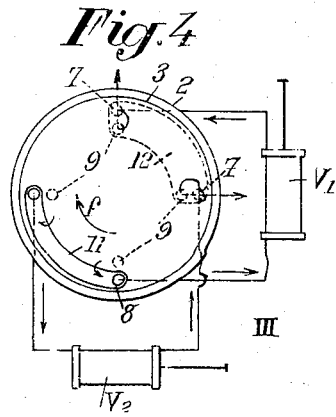
Fig. 4
Fig. 5

March 24, 1959 J. VUILLEMIN 2,878,786
MULTIPLE VALVE APPARATUS FOR DISTRIBUTING FLUID
TO A PLURALITY OF FLUID OPERATED DEVICES
Filed April 26, 1954 4 Sheets-Sheet 2

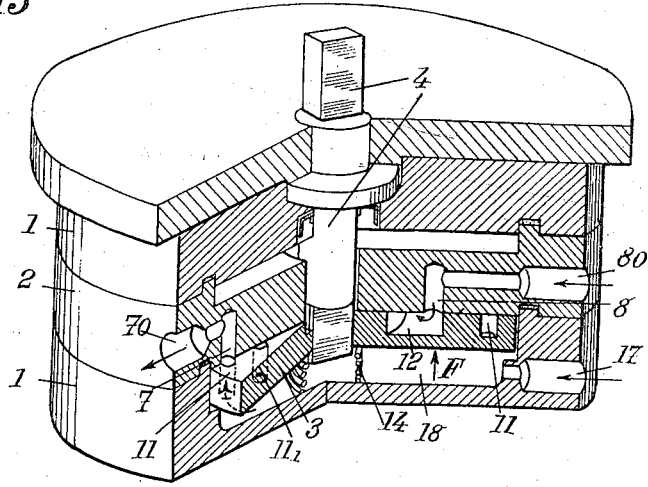

United States Patent Office 2,878,786
Patented Mar. 24, 1959

2,878,786

MULTIPLE VALVE APPARATUS FOR DISTRIBUTING FLUID TO A PLURALITY OF FLUID OPERATED DEVICES

Jean Vuillemin, Paris, France, assignor to Fonderies Debard, Paris, France, a French society Application April 26, 1954, Serial No. 425,533

Claims priority, application France May 7, 1953

4 Claims. (Cl. 121—46.5)

The present invention relates to valve apparatus for distributing a fluid (either liquid or gaseous) under a pressure different from atmospheric pressure to a plurality of fluid operated devices.

The object of my invention is to provide an apparatus of this kind which is better adapted to meet the requirements of practice than those used up to the present time.

According to my invention, the apparatus includes at least one fixed plate mounted in a suitable casing and connected to several fluid operated devices (for instance jacks), said plate cooperating with a rotary disc resiliently applied on said plate and provided with grooves so as to cooperate with passages provided in said plate so as to distribute fluid to said fluid operated devices in such manner that the successive operation of said devices is obtained by rotating the distributing disc always in the same direction.

Preferred embodiments of my invention will be hereinafter described with reference to the accompanying drawings, given merely by way of example, and in which:

Fig. 1 is a perspective view, with parts in section on the line I—I of Fig. 2, of a multiple valve apparatus according to my invention.

Figs. 2 to 5 are diagrammatical views showing respectively, in four different relative positions, the essential distributing elements of said valve apparatus, seen from below in the direction of the arrow F of Fig. 1, two jacks being shown to cooperate with this valve apparatus.

Fig. 13 is a perspective view partly in section on the line XIII—XIII of Fig. 14 of a valve apparatus made according to another embodiment of my invention.

Figs. 14 to 17 are diagrammatical views analogous to Figs. 2 to 5, but relating to the apparatus of Fig. 13.

Figure 6:
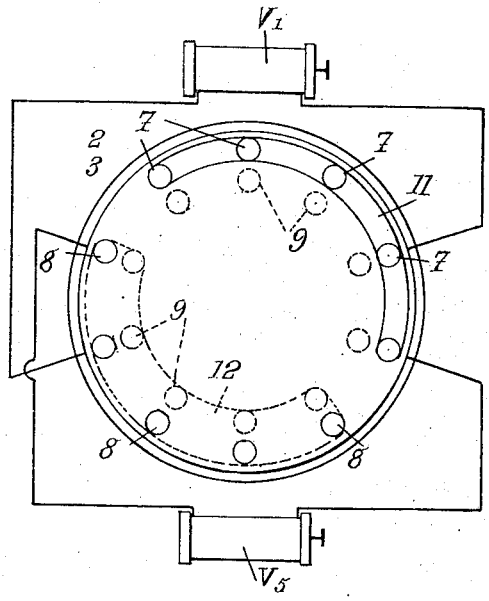
Fig. 6 is a view analogous to Fig. 2 but relating to an apparatus for controlling the operation of five jacks.

The apparatus shown by the drawing is supposed to constitute a pneumatic distribution valve which includes a casing 1 in which is fitted a fixed plate 2 (Fig. 1) provided with several conduits or tubular passages intended to be connected with the jacks or other fluid operated devices to be controlled, this plate 2 cooperating with a distributing disc 3 rotatable in casing 1 and provided with grooves adapted to cooperate with said passages for controlling the distribution of air under pressure to said jacks.

A system constituted by one such plate 2 and one such disc 3 is arranged to control at least two jacks such as $V_1$, $V_2$ (Figs. 2 to 5) in the desired fashion.

It may be desired to operate said jacks successively in one direction after which their operation is reversed so as to bring them into initial position in the reverse order, and this will be hereinafter called "single reversing." It may also be desired to operate said jacks successively but in such manner that each of them, before the next one is operated, is given a displacement in one direction and another displacement in the other direction. This will hereinafter be called "double reversing."

These operations are obtained by rotating the distributing disc, and this rotation may be effected in various ways, to wit either first in one direction and then in the opposite direction, or always in the same direction so that at the end of a cycle of operations the parts have turned through 360° and everything is back to its initial position.

It will first be supposed that it is desired to control two jacks $V_1$, $V_2$ in what has been called simple reversing fashion and by imparting to the distributing disc 3 a reciprocating movement, that is to say a rotation in one direction followed by a rotation in the opposed direction to return the jacks to their initial position.

A distributing disc 3 is advantageously mounted so as to be pressed by a spring 14 against fixed plate 2. Plate 2 is itself secured between elements of the casing 1 through which extends a driving shaft 4 for rotating distributing disc 3. Compressed air or another fluid under pressure is admitted into a chamber 18 through an inlet conduit 17.

Fixed plate 2 is provided with two sets of conduits parallel to shaft 4 and the orifices of which in the face of said plate which is in contact with distributing disc 3 are disposed along two concentric circles $C_1$, $C_2$ (Fig. 2).

The conduits of the first set 7, 8, are intended to be connected two by two respectively to the inlets and the outlets of the jacks.

The conduits 9 of the second set serve to exhaust the fluid under pressure to the outside.

In Fig. 1, conduits 7, 8 are connected with coupling elements 70, 80, themselves connected with the jacks. Conduits 9 communicate with the atmosphere at 90.

The conduits 7, 8 which are connected with one of the jacks are disposed at 180° on the corresponding circle $C_1$, whereas the conduits 7, 8 corresponding to the other jack are similarly disposed but along a line at 90° with respect to the line of the two first conduits 7, 8. Furthermore, conduits 9 are provided along the same radii as conduits 7, 8, but on circle $C_2$. Distributing disc 3 is provided, to cooperate with said conduits, with an intake groove 11 in the form of a quarter of a circle, which is constantly in communication with a source of compressed air, this groove extending along circle $C_1$ and being of a width corresponding substantially to the orifice of conduits 7, 8. Disc 3 is further provided, symmetrically to groove 11 with respect to the axis, with an exhaust groove 12 of a width sufficient to cover both of the circle $C_1$, $C_2$ and to connect conduits 7 and 8 with exhaust conduit 9.

The operation of such an apparatus is illustrated by Figs. 2 to 5.

Fig. 2 corresponds to a starting position I. Jacks $V_1$, $V_2$ are both supposed to be in the retracted position. The arrows indicate the inflow of air to the jacks through conduits 7, from groove 11, and the outflow of air through conduits 8, 9 interconnected by groove 12.

When disc 3 is rotated in the direction of arrow $f$ to bring it into position II (Fig. 3), jack $V_1$ is caused to expand whereas jack $V_2$ still remains in retracted position.

By further rotating disc 3 in the same direction, position III is obtained (Fig. 4) in which jack $V_2$ is expanded, while jack $V_1$ remains also expanded.

Then comes the return of the jacks to their initial position by operating disc 3 in a direction opposed to that of arrow $f$, first to position IV (retraction of jack $V_2$), then back into the initial position I (both of the jacks being retracted).

The above arrangement, according to which each of the conduits 7, 8 serves alternately to the admission and to the exhaust of the fluid to the corresponding jack, may extend to any number of jacks. In this case, conduits 7, 8, 9 and the corresponding orifices are suitably distributed over the periphery of the circumference as shown by Fig. 6 which relates to the case of five jacks (only two of them $V_1$ and $V_5$ being shown on the drawings).

If now it is desired to control at least two jacks in double reversing fashion, that is to say by successively expanding then retracting each of the jacks before the next one is operated, I may proceed as follows.

According to the embodiment of Figs. 7 to 11, in which it is supposed to be applied to the case of two jacks, the ends of each jack are respectively connected to two conduits 7 and 8 disposed on the fixed plate 2 at 90° to each other on two distinct circles $C_1$ and $C_3$, the two sets of orifices corresponding to said two jacks being symmetrically disposed.

I also provide in fixed plate 2 for exhaust conduits 9 in the same radial planes as the above mentioned conduits and along an intermediate circle $C_2$.

The distributing disc 3 includes four inlet conduits, three of them 11 being in respective radial planes at 90° to each other and on circle $C_1$, and the fourth $11_1$ being in the same radial plane as one of the preceding ones, but on circle $C_3$.

Distributing disc 3 is further provided with three exhaust grooves disposed radially opposite conduits 11, two of them 12 extending over two adjacent circles, that is to say over circles $C_2$ and $C_3$, while the third one, $12_1$, extends to cover the three circles.

The operation of this device is illustrated by Figs. 8 to 11. When distributing disc 3 is rotated, always in the same direction $f$, I simultaneously obtain:

In position I (Fig. 8) retraction of both of the jacks. the air flowing along the path shown by the arrows and conduit $11_1$ (which is the reversing conduit) remaining inoperaitve.

In position II (Fig. 9) expansion of jack $V_1$ through the double action of intake or reversing conduit $11_1$ and of exhaust conduit $12_1$ which covers circle $C_1$, nothing taking place concerning jack $V_2$.

In position III (Fig. 10), retraction of jack $V_1$, jack $V_2$ still remaining retracted.

In position IV (Fig. 11), expansion of jack $V_2$, whereas jack $V_1$ remains retracted.

After this, the device comes back into position I in which both of the jacks are retracted, and so on.

Figure 12:
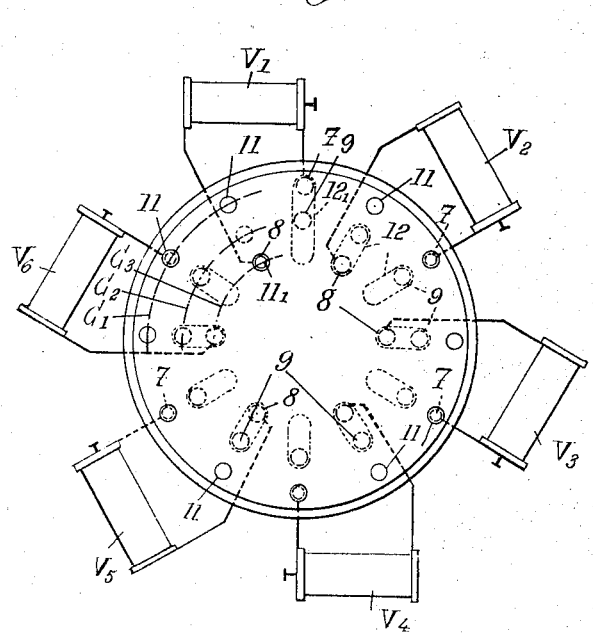
Fig. 12 is a view analogous to Fig. 8 but relating to an apparatus for controlling six jacks.
Figure 7:
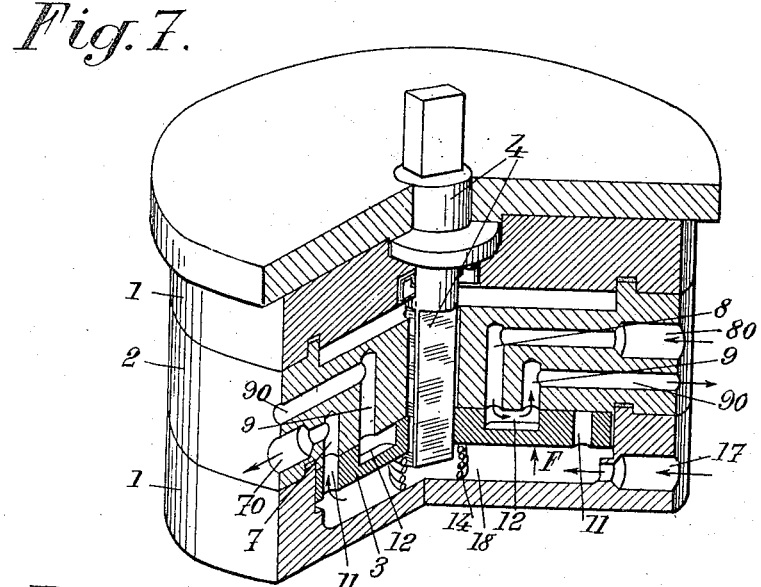
Fig. 7 is a perspective view with parts in section on the line VII—VII of Fig. 9 of a valve apparatus made according to another embodiment of my invention.
Figure 8:
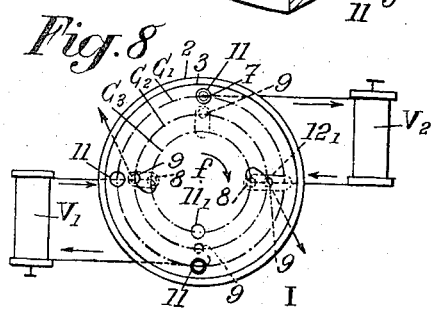
Figs. 8 to 11 are views analogous to Figs. 2 to 5, but corresponding to the apparatus of Fig. 7.
Figure 9:
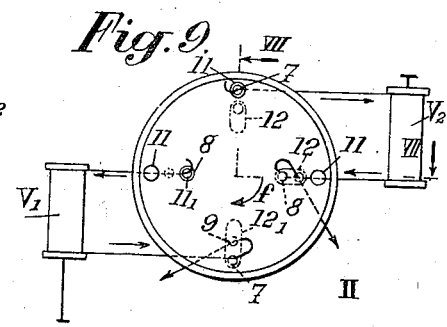
Figure 10:
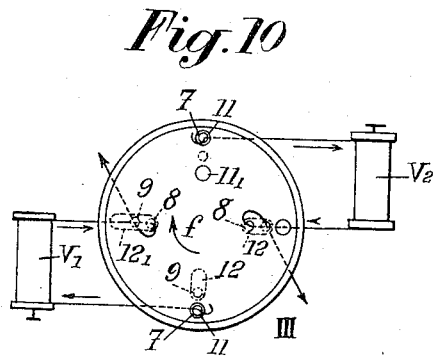
Figure 11:
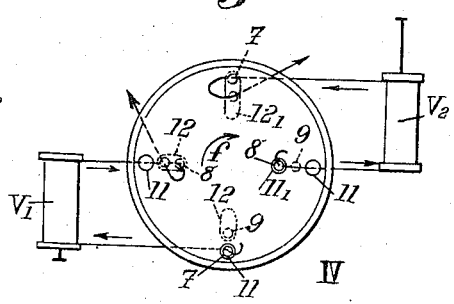

What has been told concerning this construction extends to the case where there is any number of jacks, as illustrated by Fig. 12 which corresponds to the case of six jacks being operated by the apparatus.

This figure shows that I provide on fixed plates 2: on the outer circle $C_1$, a number of conduits 7 equal to $n$ ($n=6$) disposed at angular intervals equal to $$\frac{2\pi}{n}$$

on the intermediate circle $C_2$, a number $2n$ of conduits 9 disposed at angular intervals equal to $$\frac{\pi}{n}$$

and on the inner circle $C_3$, a number $n$ of holes 8.

On distributing disc 3 I provide: a number of inlet conduits 11 equal to $(2n-1)$ and disposed on the outer circle $C_1$, and furthermore an inlet conduit $11_1$ opposite one of the preceding ones and located on circle $C_3$; a number $(2n-2)$ of radial grooves 12 located opposite conduits 11 but with the exception of the radial plane which comprises reversing conduit $11_1$, and a radial groove $12_1$ in the radial plane where there is no conduit 11 or $11_1$.

The operation of such a device results from the preceding explanations. The expansions followed by the retraction of the end jacks are obtained successively for said six jacks by rotating distributing disc 3 always in the same direction.

In the above described embodiment, the exhaust conduits 9 of plate 2 are located in the same radial planes as conduits 7 and 8, which may involve the necessity of superimposing outlets such as 90 and 70 or 80, whereby said plate must be made of a relatively substantial thickness.

This thickness may be reduced by disposing conduits 9 in radial planes different from those which contain conduits 7 and 8.

For instance, in the construction of Figs. 13 to 17, I proceed, concerning conduits 7, 8 and 11, in the same way as above described with reference to Figs. 7 to 12. However, circles $C_1$ and $C_3$ may be located nearer to each other, but in order to achieve exhaust of the fluid under pressure, I make use of the following arrangement, in the case of two jacks.

On the one hand, in fixed plate 2, two conduits 9 which may be in a radial plane different from those containing conduits 7, 8, 11, in particular at 45° thereto, said conduits 9 being disposed on a circle $C_2$ inside the two preceding circles.

On the other hand, in movable disc 3, a semi-circular groove 12 surrounding circles $C_2$, $C_3$ and provided, at one end thereof, with an extension $12_1$ which plays the same part as that of radial groove $12_1$ of Figs. 7 to 11.

The operation is obvious since the successive steps of Figs. 14 to 17 are the same as those of Figs. 8 to 11.

According to a modification, I might even provide one single conduit 9 instead of two conduits by making use, as indicated in dash and dot lines on Fig. 17, of semi-circular grooves $12_2$ completing groove 12 and extending at the level of circle $C_2$ which comprises conduit 9.

It should be noted that, on Figs. 8 to 12 and 14 to 17, the orifices of conduits 7, 8, 9 of fixed plate 2 have been shown with diameters slightly smaller than those of conduits 11, but this merely in order to clarify the drawings.

In some cases where it is desired to have both simple reversing and multiple reversing, I may stack on each other several groups of plates or rings such as 2, 3, having different characteristics.

My apparatus has the advantage that the various orifices and conduits it includes are better utilized and consequently that the volume occupied by this apparatus is reduced to a minimum.

My invention is applicable in all cases where it is desired to control a machine or a plant through cylinders, jacks or other devices which must operate in predetermined conditions (machine-tools, conveying machines, systems for opening gates or hoppers, for controlling sanding machines or elements of molding or casting machines, etc.).

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In combination, at least two fluid operated devices and a valve apparatus for distributing a fluid under pressure to said devices, said apparatus comprising a casing including at least one fixed plate provided with at least two pairs of ports, the two ports of each of said pairs being connected to the opposed ends of one of said devices respectively, said plate being further provided with an exhaust port, a distributing and reversing disc rotatable in said casing about an axis at right angles to said disc and slidable with respect to said plate, means for resiliently pressing said disc against said plate, said casing forming a chamber on the other side of said disc from said plate and being provided with an inlet passage for the feed of fluid under pressure to said chamber, said distributing disc being provided in the face thereof adjoining said plate with two arcuate grooves in the form of circular arcs and with a passage extending from one side to the other of said disc and opening into one of said grooves, said plate being provided with at least two pairs of conduits parallel to said axis and disposed on a cylinder of revolution about said axis, said pairs of conduits communicating with said two pairs of ports respectively, said plate being further provided with at least two pairs of other conduits also parallel to said axis and communicating with said exhaust port, these last mentioned conduits being located on a cylinder coaxial with the first mentioned one but of different diameter, the groove into which opens said passage being of a radius and width such that it cooperates with the two first mentioned pairs of conduits and the other groove being of a radius and width such that it cooperates with all of said conduits, and means for controlling the rotation of said disc in said casing.

2. In combination, at least two fluid operated devices and a valve apparatus for distributing a fluid under pressure to said devices, said apparatus comprising a casing including at least one fixed plate provided with at least two pairs of ports, the two ports of each of said pairs being connected to the opposed ends of one of said devices respectively, said plate being further provided with exhaust ports, a distributing and reversing disc rotatable in said casing about an axis at right angles to said disc and slidable with respect to said plate, means for resiliently pressing said disc against said plate, said casing forming a chamber on the other side of said disc from said plate and being provided with an inlet passage for the feed of fluid under pressure to said chamber, said distributing disc being provided in the face thereof adjoining said plate with at least three radial grooves and being further provided with passages parallel to said axis and extending from one side to the other of said disc, said plate being provided with at least two pairs of conduits parallel to said axis and disposed respectively on two coaxial cylinders of revolution about said axis, said pairs of conduits communicating with said two pairs of ports respectively, said plate being further provided with at least two pairs of other conduits also parallel to said axis and communicating with said exhaust ports, these last mentioned conduits being located on a cylinder coaxial with the two first mentioned cylinders and of a diameter intermediate between their respective diameters, said grooves being of different radial lengths so that two of them intersect two of said cylinders and one of them intersects said three cylinders, and means for controlling the rotation of said disc in said casing.

3. In combination, at least two fluid operated devices and a valve apparatus for distributing a fluid under pressure to said devices, said apparatus comprising a casing including at least one fixed plate provided with at least two pairs of ports, the two ports of each of said pairs being connected to the opposed ends of one of said devices respectively, said plate being further provided with exhaust ports, a distributing and reversing disc rotatable in said casing about an axis at right angles to said disc and slidable with respect to said plate, means for resiliently pressing said disc against said plate, said casing forming a chamber on the other side of said disc from said plate and being provided with an inlet passage for the feed of fluid under pressure to said chamber, said distributing disc being provided in the face thereof adjoining said plate with at least three radial grooves and being further provided with passages parallel to said axis and extending from one side to the other of said disc, said plate being provided with at least two pairs of conduits parallel to said axis and disposed respectively on two coaxial cylinders of revolution about said axis, said pairs of conduits communicating with said two pairs of ports respectively, said plate being further provided with at least two pairs of other conduits also parallel to said axis and communicating with said exhaust ports, these last mentioned conduits being located on a cylinder coaxial with the two first mentioned cylinders and of a diameter intermediate between their respective diameters, the second mentioned pairs of conduits being located in the same radial planes as the first mentioned pairs of conduits respectively, said grooves being of different radial lengths so that two of them intersect two of said cylinders and one of them intersects said three cylinders, and means for controlling the rotation of said disc in said casing.

4. In combination, at least two fluid operated devices and a valve apparatus for distributing a fluid under pressure to said devices, said apparatus comprising a casing including at least one fixed plate provided with at least two pairs of ports, the two ports of each of said pairs being connected to the opposed ends of one of said devices respectively, said plate being further provided with exhaust ports, a distributing and reversing disc rotatable in said casing about an axis at right angles to said disc and slidable with respect to said plate, means for resiliently pressing said disc against said plate, said casing forming a chamber on the other side of said disc from said plate and being provided with an inlet passage for the feed of fluid under pressure to said chamber, said distributing disc being provided with passages parallel to said axis and extending from one side to the other of said disc, said plate being provided with at least two pairs of conduits parallel to said axis and disposed respectively on two coaxial cylinders of revolution about said axis, said pairs of conduits communicating with said two pairs of ports respectively, said plate being further provided with at least two pairs of other conduits also parallel to said axis and communicating with said exhaust ports, these last mentioned conduits being located on a cylinder coaxial with the two first mentioned cylinders and of a diameter intermediate between their respective diameters, the second mentioned pairs of coduits being located in radial planes offset with respect to the respective radial planes of the first mentioned pairs of conduits, said distributing disc being further provided, in the face thereof adjoining said plate with a groove in the form of a circular arc of a radius and a width such that it intersects the inner and the intermediate cylinders, said groove having a radial extension which intersects the outer cylinder, and means for controlling the rotation of said disc in said casing.

References Cited in the file of this patent

UNITED STATES PATENTS

| | | |
|---|---|---|
| 1,976,417 | Steinberg | Oct. 9, 1934 |
| 2,675,830 | Vuillemin | Apr. 20, 1954 |
| 2,677,391 | Chellberg | May 4, 1954 |